(12) United States Patent
Haneda et al.

(10) Patent No.: US 6,879,061 B2
(45) Date of Patent: Apr. 12, 2005

(54) CURRENT ADJUSTING APPARATUS AND CURRENT ADJUSTING METHOD

(76) Inventors: Masaji Haneda, c/o NTT Data Corporation, 3-3, Toyosu 3-chome, Kotu-ku, Tokyo 135-6033 (JP); Someji Inoue, c/o Sinano Electric Co., Ltd., 23-11, Sengoku 1-chome, Bunkyo-ku, Tokyo 112-0011 (JP)

( * ) Notice: Subject to any disclaimer, the term of this patent is extended or adjusted under 35 U.S.C. 154(b) by 0 days.

(21) Appl. No.: 10/148,723

(22) PCT Filed: Sep. 28, 2001

(86) PCT No.: PCT/JP01/08554

§ 371 (c)(1),
(2), (4) Date: Sep. 26, 2002

(87) PCT Pub. No.: WO02/27891

PCT Pub. Date: Apr. 4, 2002

(65) Prior Publication Data

US 2003/0090156 A1 May 15, 2003

(30) Foreign Application Priority Data

Sep. 28, 2000 (JP) ........................ 2000-295784

(51) Int. Cl.⁷ .............................. H02J 7/00; H02J 3/24
(52) U.S. Cl. ............................ 307/102; 307/64; 307/85
(58) Field of Search ............................ 307/66, 85, 43, 307/60–64, 80, 326, 46, 52, 102; 363/37, 39, 88, 86, 89, 41; 323/209, 212, 220, 233, 207, 210

(56) References Cited

U.S. PATENT DOCUMENTS

| 4,010,381 A | * | 3/1977 | Fickenscher et al. | 307/66 |
| 4,763,014 A | * | 8/1988 | Model et al. | 307/66 |
| 4,780,802 A | * | 10/1988 | Miyashita et al. | 363/37 |
| 4,891,744 A | * | 1/1990 | Yamamoto et al. | 363/89 |

FOREIGN PATENT DOCUMENTS

| JP | 59-148913 | 8/1984 |
| JP | 01-298414 | 12/1989 |
| JP | 10-042467 | 2/1998 |
| JP | 9-5 2004-035623504 | 8/2004 |

* cited by examiner

Primary Examiner—Rajnikant B. Patel
(74) Attorney, Agent, or Firm—Baker & McKenzie LLP

(57) ABSTRACT

A direction and a magnitude of a current flowing between an external alternating current power source (20) and a load (30) are detected by a current transformer (11). A voltage generated to a secondary winding (11B) of the current transformer as a result of detection is superimposed upon a voltage of the alternating current power source (20), and is supplied to the synchronous power source (S). The synchronous power source (S) generates a voltage having an instantaneous value which is the same as that of the voltage supplied thereto, and applies the generated voltage to the load (30) in parallel. Since the voltage applied by the synchronous power source (S) has a value for lowering the current detected by the current transformer (11), there is substantially no current flowing between the alternating current power source (20) and the load (30).

18 Claims, 4 Drawing Sheets

CURRENT ADJUSTING APPARATUS AND CURRENT ADJUSTING METHOD

TECHNICAL FIELD

The present invention relates to a current regulator and a current regulation method, and particularly relates to a current regulator and a current regulation method which regulate a current supplied from a power source to a load.

BACKGROUND ART

Generally, commercial electricity supplied by power supply service providers is alternating current electricity. Alternating current electricity is used for driving a load having various electric characteristics.

Recently, other than commercial electricity, private electricity generators have been used as private power sources. Also, electricity sales have been started. In electricity sales, one supplies electricity generated by a private power source to existing commercial electric power systems, and charges for the supplied electricity.

When practicing electricity sales, there is a problem that an inflow of a power flow occurs from the private electricity generator to the commercial electric power system (i.e., a reverse power flow occurs). A reverse power flow causes unfavorable influence on devices driven by the commercial electricity. Further, an integrating wattmeter may not function properly due to a reverse power flow. If the integrating wattmeter malfunctions, the electricity seller cannot receive correct charges for the electricity.

As a method of preventing a reverse power flow, there has been a method of slightly changing the frequency of an alternating current voltage generated by a private electricity generator, monitoring changes of an alternating current, and determining the existence of a reverse power flow in accordance with the monitoring result.

However, according to this method, the structure of a private electricity generator becomes complicated. Further, according to this method, a load to be driven by commercial electricity will be supplied with an alternating current voltage having a complicated waveform. Because of this, electricity cannot be supplied to this load efficiently (that is, the power factor falls). Furthermore, according to this method, other unfavorable influences may be caused on operations of the load.

DISCLOSURE OF INVENTION

The present invention was made in view of the above circumstances, and it is an object of the present invention to provide a current regulator and a current regulation method capable of preventing occurrence of a reverse power flow with a simple structure.

And it is another object of the present invention to provide a current regulator and a current regulation method for efficiently supplying electricity to a load (that is, for improving power factor).

To accomplish the above objects, a current regulator according to a first aspect of the present invention comprises:

a current detection circuit (11) which detects a direction and a magnitude of a current flowing between an external alternating current power source and an external load; and a correction voltage application circuit (S, 11, 16) which generates a correction voltage having a value for lowering the current detected by the current detection circuit, and applies the correction voltage between both terminals of a current path including the load.

According to such a current regulator, a current flowing between an alternating current power source and a load is canceled by application of a correction voltage to a current path including the load, and an electricity is efficiently supplied to the load while occurrence of a reverse power flow is prevented with a simple structure.

The current detection circuit may comprise a circuit (11B) which generates a detection voltage having a polarity and magnitude which represent the direction and voltage of the detected current.

In this case, the correction voltage application circuit may apply the correction voltage by comprising:

a correction alternating current voltage generation circuit (12, 16) which obtains a correction alternating current voltage having a phase substantially equal to that of an alternating current voltage generated by the alternating current power source; and a correction voltage generation circuit (11B, 12) which superimposes the correction alternating current voltage and the detection voltage, and generates the correction voltage having a value determined by a voltage obtained by the superimposing, by converting a correction electricity supplied by a correction power source which does not substantially consume an electricity supplied by the alternating current power source.

The correction power source may comprise a secondary battery (13).

In this case, if the correction voltage application circuit comprises a circuit (12) which rectifies an electricity caused by a power flow when the power flow flows in from outside to a node which generates the correction voltage, and charges the secondary battery with a direct current electricity obtained by the rectifying, excess electricity is charged, and utilization of electricity becomes more efficient.

If the current regulator comprises a charge forcing circuit (R1, R2, RY1, 15) which lowers the correction voltage by dividing the voltage obtained by superimposing the correction alternating current voltage and the detection voltage, and forces a power flow to flow in from outside to the node which generates the correction voltage, charging of the secondary battery is securely performed.

The charge forcing circuit may lower the correction voltage, and force a power flow to flow in from outside to the node which generates the correction voltage by, for example, comprising:

a control circuit (15) which determines whether or not a predetermined condition has come, and when determining that the condition has come, outputs a signal for notifying that charging will be performed; and a voltage dividing circuit (R1, R2, RY1) which obtains the signal output by the control circuit, and in response to the signal, divides the voltage obtained by superimposing the correction alternating current voltage and the detection voltage.

If the current regulator comprises a power failure monitor circuit (17, RY2) which determines whether or not a power failure occurs in the alternating current power source, and when determining that a power failure occurs, cuts off the node which generates the correction voltage from the load and the alternating current power source, abrupt consumption of the secondary battery can be avoided. And if the secondary battery supplies electricity to the external load even after the node which generates the correction voltage is cut off from the alternating current power source, this external load can be supplied with electricity even if a power failure occurs in the alternating current power source.

The power failure monitor circuit may comprise:

a determination circuit (17) which determines whether or not a power failure occurs in the alternating current power source based on a voltage of a connection point of the load and the current detection circuit, and when determining that a power failure occurs, outputs a signal for notifying the power failure; and a current path (RY2) which obtains the signal output by the determination circuit, and in response to the signal, cuts off the node which generates the correction voltage from the load and the alternating current power source.

If the current regulator comprises a circuit (18) which generates a direct current electricity by generating an electricity, and charges the secondary battery with the direct current electricity, generation of the correction voltage becomes more efficient.

The correction alternating current voltage generation circuit may generate the correction alternating current voltage without substantially consuming an electricity supplied by the alternating current power source.

In this case, when a power failure occurs in the alternating current power source, if the correction alternating current voltage generation means generates as the correction alternating current voltage, a voltage having a phase substantially equal to that of an alternating current voltage which has been generated by the alternating current power source before the power failure occurs, the correction voltage is continuously generated even in case of a power failure. Therefore, by application of the correction voltage to the external load, this load can be driven even in a case where a power failure occurs.

The current detection circuit may comprise, for example, a transformer (11) which comprises:

a primary winding (11A) which is connected between the alternating current power source and the load; and a secondary winding (11B) which is inductively coupled to the primary winding.

A current regulation method according to a second aspect of the present invention comprises:

detecting (11) a direction and a magnitude of a current flowing between an external alternating current power source and an external load; and generating a correction voltage having a value for lowering the detected current, and applying the correction voltage between both terminals of a current path including the load (S, 11, 16).

According to such a current regulation method, a current flowing between an alternating current power source and a load is canceled by application of a correction voltage to a current path including the load, and an electricity is efficiently supplied to the load while occurrence of a reverse power flow is prevented with a simple structure.

The current regulation method may comprise generating (11B) a detection voltage having a polarity and magnitude which represent the direction and magnitude of the detected current.

In this case, the current regulation method may apply the correction voltage by:

obtaining (12, 16) a correction alternating current voltage having a phase which is substantially the same as that of an alternating current voltage generated by the alternating current power source; and superimposing the correction alternating current voltage and the detection voltage, and generating the correction voltage having a value determined by a voltage obtained by the superimposing, by converting a correction electricity supplied by a correction power source which does not substantially consume an electricity supplied by the alternating current power source (11B, 12).

The correction power source may be supplied from a secondary battery (13).

In this case, if the method comprises rectifying an electricity caused by a power flow when the power flow flows in from outside to a node which generates the correction voltage, and charging the secondary battery with a direct current electricity obtained by the rectifying (12), excess electricity is charged, and utilization of electricity becomes more efficient.

If the current regulation method comprises lowering the correction voltage by dividing the voltage obtained by superimposing the correction alternating current voltage and the detection voltage, and forcing a power flow to flow in from outside to the node which generates the correction voltage (R1, R2, RY1, 15), charging of the secondary battery is securely performed.

Specifically, the current regulation method may lower the correction voltage, and force a power flow to flow in from outside to the node which generates the correction voltage by:

determining whether or not a predetermined condition has come, and when determining that the condition has come, outputting a signal for notifying that charging will be performed (15); and obtaining the signal for notifying that charging will be performed, and in response to the signal, dividing the voltage obtained by superimposing the correction alternating current voltage and the detection voltage (R1, R2, RY1).

If the current regulation method may comprise determining whether or not a power failure occurs in the alternating current power source, and when determining that a power failure occurs, cutting off the node which generates the correction voltage from the load and the alternating current power source (17, RY2), abrupt consumption of the secondary battery can be avoided. And if the secondary battery supplies electricity to the external load even after the node which generates the correction voltage is cut off from the alternating current power source, this external load can be supplied with electricity even if a power failure occurs in the alternating current power source.

Specifically, the current regulation method may comprise, for example:

determining whether or not a power failure occurs in the alternating current power source based on a voltage of a connection point of the load and the current detection circuit, and when determining that a power flow occurs, outputting a signal for notifying the power failure (17); and obtaining the signal for notifying the power failure, and in response to the signal, cutting off the node which generates the correction voltage from the load and the alternating current power source (RY2).

If the current regulation method comprises generating a direct current electricity by generating an electricity, and charging the secondary battery with the direct current electricity (18), generation of the correction voltage becomes more efficient.

The current regulation method may comprise generating the correction alternating current voltage without substantially consuming an electricity supplied by the alternating current power source.

In this case, when a power failure occurs in the alternating current power source, if the current regulation method comprises generating as the correction alternating current voltage, a voltage having a phase substantially equal to that of an alternating current voltage which has been generated by the alternating current power source before the power source occurs, the correction voltage is continuously generated even in case of a power failure. Therefore, by application of the correction voltage to the external load, this load can be driven even in a case where a power failure occurs.

The detecting a direction and a magnitude of a current flowing between the alternating current power source and the load may be performed based on a signal which is generated by a secondary winding (11B) included in a transformer (11) which comprises a primary winding (11A) which is connected between the alternating current power source and the load, and the secondary winding which is inductively coupled to the primary winding.

BEST MODE FOR CARRYING OUT THE INVENTION

A current regulator and a current regulation method according to an embodiment of the present invention will now be explained below with reference to the drawings, and by employing a current regulator as an example.

Figure 1:
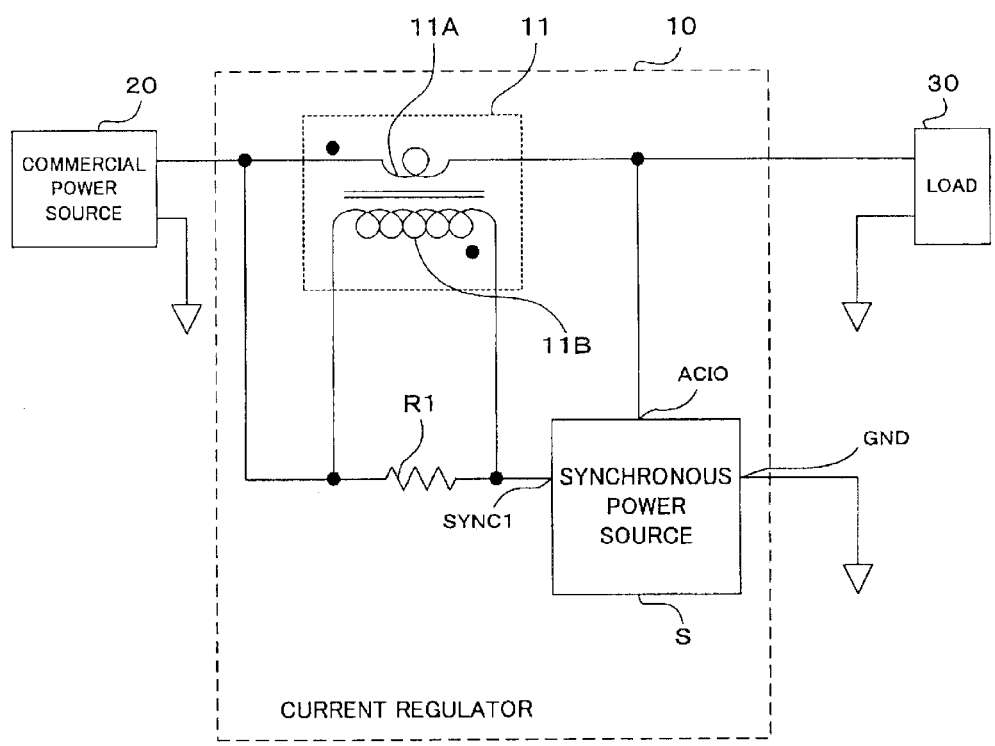
FIG. 1 is a block diagram showing a structure of a current regulator according to an embodiment of the present invention.

FIG. 1 is a block diagram showing the structure of a current regulator according to the embodiment of the present invention.

As illustrated, this current regulator 10 comprises a current transformer 11, a resistor R1, and a synchronous power source S.

The current transformer 11 comprises a primary winding 11A and a secondary winding 11B. The primary winding 11A and the secondary winding 11B are inductively coupled to each other. One terminal of the primary winding 11A is connected to one of a pair of terminals of a commercial power source 20 which generates a single-phase AC (alternating current) voltage. The other terminal of the primary winding 11A is connected to one of a pair of terminals of an external load 30, and to a later-described AC input/output terminal ACIO of the synchronous power source S. The other one of the pair of terminals of the commercial power source 20 and the other one of the pair of terminals of the load 30 are both grounded.

One terminal of the secondary winding 11B is connected to the connection point of the commercial power source 20 and the primary winding 11A. The other terminal of the secondary winding 11B is connected to a synchronous input terminal of the synchronous power source S. The resistor R1 is connected between the both terminals of the secondary winding 11B.

It should be noted that when an alternating current flows through the primary winding 11A, and thereby a voltage of the terminal out of the both terminals of the primary winding 11A that is connected to the commercial power source 20 becomes positive polarity with respect to the other terminal, such a voltage is induced to the secondary winding 11B that the terminal out of the both terminals of the secondary winding 11B that is connected to the synchronous power source S becomes positive polarity with respect to the other terminal.

The synchronous power source S comprises the synchronous input terminal SYNC1, the AC input/output terminal ACIO, and a ground terminal GND. The synchronous power source S generates to the AC input/output terminal ACIO, a voltage having an instantaneous value substantially the same as an instantaneous value of a voltage which is applied to the synchronous input terminal SYNC1.

It should be noted that the synchronous power source S buffers the voltage supplied to the synchronous input terminal SYNC1. That is, the synchronous power source S does not substantially consume the electricity supplied to the synchronous input terminal SYNC1, but supplies electricity to the AC input/output terminal ACIO from an external power source other than the commercial power source 20, or from a power source included in the synchronous power source S.

The synchronous input terminal SYNC1 of the synchronous power source S is connected to the one out of the both terminals of the secondary winding 11B that is not connected to the commercial power source 20, as described above. The AC input/output terminal ACIO is connected to the connection point of the primary winding 11A and the load 30.

Next, an operation of the current regulator 10 for regulating a current flowing from the commercial power source 20 to the load 30 will be explained.

When the commercial power source 20 generates a single-phase AC voltage, a current flows between the commercial power source 20 and the load 30 via the primary winding 11A. As a result, an AC voltage is induced to the secondary winding 11B. And such a voltage is applied to the synchronous input terminal SYNC1 of the synchronous power source S as equal to a superimposed voltage made of the voltage between the both terminals of the secondary winding 11B, and the voltage generated by the commercial power source 20.

Let it be assumed that an instantaneous value of the AC voltage generated by the commercial power source 20 becomes higher than an instantaneous value of a voltage of the connection point of the AC input/output terminal ACIO of the synchronous power source S and the current transformer 11. At this instant, an electromotive force which is in a direction in which the voltage to be applied to the synchronous input terminal SYNC1 of the synchronous power source S becomes higher than the AC voltage generated by the commercial power source 20, is induced to the secondary winding 11B. Consequently, a voltage to be generated to the AC input/output terminal ACIO of the synchronous power source S becomes higher.

In contrast, let it be assumed that an instantaneous value of the AC voltage generated by the commercial power source 20 becomes lower than an instantaneous value of the voltage of the connection point of the AC input/output terminal ACIO and the current transformer 11. At this instant, the voltage to be applied to the synchronous input terminal SYNC1 becomes lower than the AC voltage generated by the commercial power source 20 due to an electromotive force induced to the secondary winding 11B. Consequently, a voltage to be generated to the AC input/output terminal ACIO becomes lower.

By continuously performing those operations, an instantaneous value of the voltage of the connection point of the AC input/output terminal ACIO of the synchronous power source S and the current transformer 11 becomes substantially the same as an instantaneous value of the AC voltage generated by the commercial power source 20, and a current substantially ceases to flow through the primary winding 11A. That is, it is so regulated that a current does not flow between the commercial power source 20 and the load 30. Therefore, even if an external power source such as a private electricity generator, etc. is connected to the load 30 in parallel, a reverse power flow does not substantially occur from this power source to the commercial power source 20.

The structure of the current regulator 10 is not limited to the above-described one.

Figure 2:
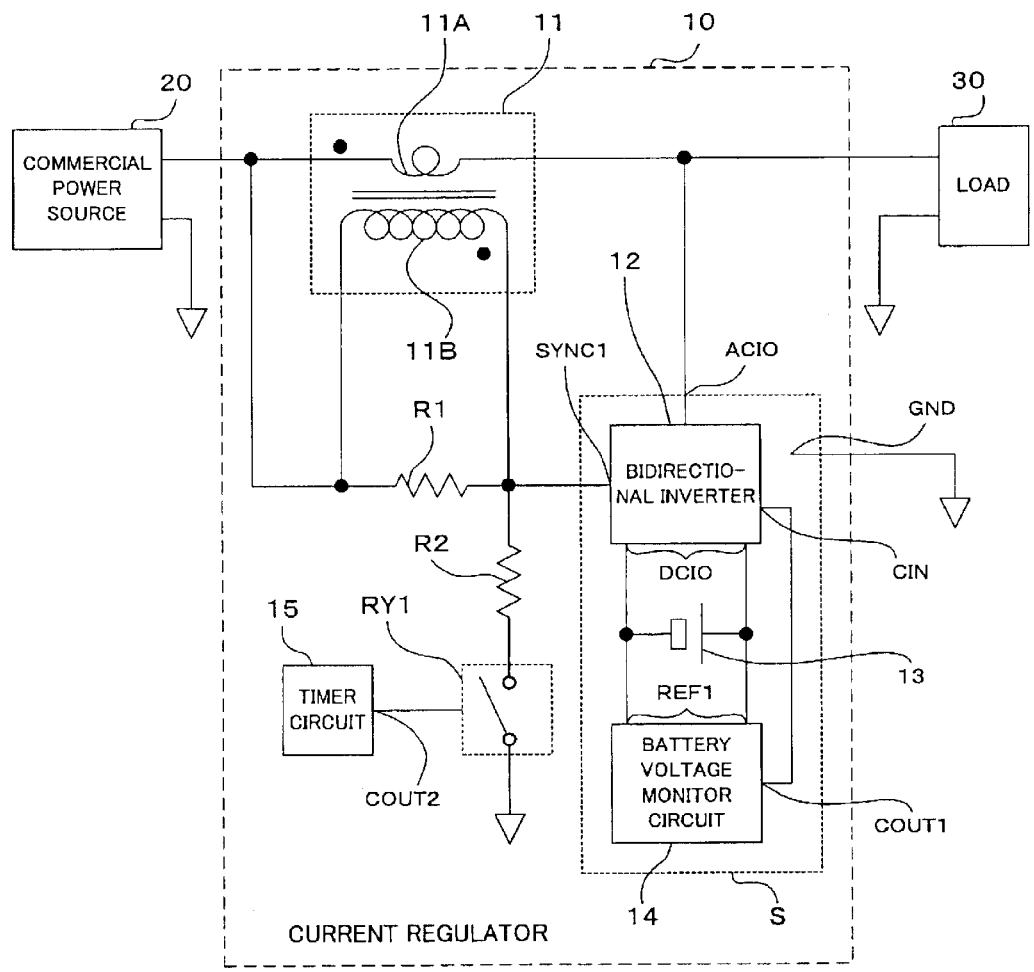
FIG. 2 is a block diagram showing a structure of an example of modification of the current regulator shown in FIG. 1.

For example, the current regulator 10 may have a structure shown in FIG. 2. That is, the synchronous power source S may comprise a bidirectional inverter 12, a secondary battery 13, and a battery voltage monitor circuit 14.

The bidirectional inverter 12 comprises a DC (direct current) input/output terminal DCIO, a control input terminal CIN, a synchronous input terminal which constitutes the synchronous input terminal SYNC1 of the synchronous power source S, an AC input/output terminal which constitutes the AC input/output terminal ACIO of the synchronous power source S, and a ground terminal which constitutes the ground terminal GND of the synchronous power source S.

The DC input/output terminal DCIO is connected to both of an anode and cathode of the secondary battery 13. The control input terminal CIN is connected to a later-described control output terminal COUT1 of the battery voltage monitor circuit 14.

The bidirectional inverter 12 generates to the AC input/output terminal ACIO, a voltage having an instantaneous value substantially the same as an instantaneous value of a voltage which is applied to the synchronous input terminal SYNC1. Then, in a case where a power flow flows out from the AC input/output terminal ACIO to the outside of the bidirectional inverter 12, the bidirectional inverter 12 supplies electricity from the secondary battery 13 to the AC input/output terminal ACIO via the DC input/output terminal DCIO. On the other hand, in a case where a power flow flows in from the outside of the bidirectional inverter 12 to the AC input/output terminal ACIO, the bidirectional inverter 12 rectifies the current flowing in to the AC input/output terminal ACIO. Then, the bidirectional inverter 12 supplies a direct current obtained by the rectification to the secondary battery 13 via the DC input/output terminal DCIO. Thus, the secondary battery 13 is charged.

When a predetermined operation stop signal is supplied to the control input terminal CIN, the bidirectional inverter 12 substantially cuts off the AC input/output terminal ACIO. In other words, the bidirectional inverter 12 controls the input impedance and output impedance of the AC input/output terminal ACIO to be infinitely great. That is, when an operation stop signal is supplied to the control input terminal CIN, the bidirectional inverter 12 substantially stops operating.

The bidirectional inverter 12 may have a function for substantially cutting off the AC input/output terminal ACIO when a magnitude of a current flowing through the AC input/output terminal ACIO or the DC input/output terminal DCIO exceeds a predetermined rated value.

The battery voltage monitor circuit 14 comprises a pair of input terminals REF 1, and the control output terminal COUT1. The pair of input terminals REF 1 are connected to different one of the anode and cathode of the secondary battery 13. The control output terminal COUT1 is connected to the control input terminal CIN of the bidirectional inverter 12.

The battery voltage monitor circuit 14 determines whether a voltage between the both terminals of the secondary battery 13 (that is, a voltage between the input terminals REF 1) is too high a voltage that exceeds a predetermined value or too low a voltage. Then, when determining that the voltage is either too high a voltage or too low a voltage, the battery voltage monitor circuit 14 supplies the above-mentioned operation stop signal from the control output terminal COUT1 to the control input terminal CIN of the bidirectional inverter 12.

The current regulator 10 may comprise a relay RY1, a timer circuit 15, and a resistor R2, as shown in FIG. 2.

The relay RY1 comprises a current path and a control input terminal. One terminal of the current path of the relay RY1 is connected to the synchronous input terminal SYNC 1 of the synchronous power source S via the resistor R2. The other terminal of the current path of the relay RY1 is grounded. The control input terminal of the relay RY1 is connected to a later-described control output terminal COUT2 of the timer circuit 15.

The relay RY1 turns on the current path thereof when a control signal is supplied to the control input terminal thereof, and substantially cuts off the current path thereof when the supply of the control signal is stopped.

The timer circuit 15 comprises the control output terminal COUT2. The control output terminal COUT2 is connected to the control input terminal of the relay RY1, as described above.

The timer circuit 15 repeatedly determines whether or not a predetermined time zone has come. Then, in a case where determining that the predetermined time zone has come, the timer circuit 15 supplies a control signal to the control input terminal of the relay RY1 from the control output terminal COUT2, so that the current path of the relay RY1 is turned on. And in a case where determining that the current time is not included in the time zone, the timer circuit 15 stops supplying the control signal, so that the current path of the relay RY1 is cut off.

In the structure shown in FIG. 2, when electricity is to be supplied from the synchronous power source S, this electricity is supplied from the secondary battery 13 via the bidirectional inverter 12. And in a case where a power flow flows in to the synchronous power source S from an external power source which is connected to the load 30 in parallel or from the commercial power source 20 via the AC input/output terminal ACIO for example, energy corresponding to this power flow is stored in the secondary battery 13.

Further, in the structure shown in FIG. 2, when a predetermined time zone (for example, this may be a time zone where midnight power rates are applied) comes, the current path of the relay RY1 is turned on. As a result, the amplitude of an AC voltage to be applied to the synchronous input terminal SYNC1 of the synchronous power source S becomes lower. In response to this, the amplitude of an AC voltage to be generated to the AC input/output terminal ACIO also becomes lower, thereby a power flow flows in to the synchronous power source S from the AC input/output terminal ACIO. Thus, the secondary battery 13 is charged.

Figure 3:
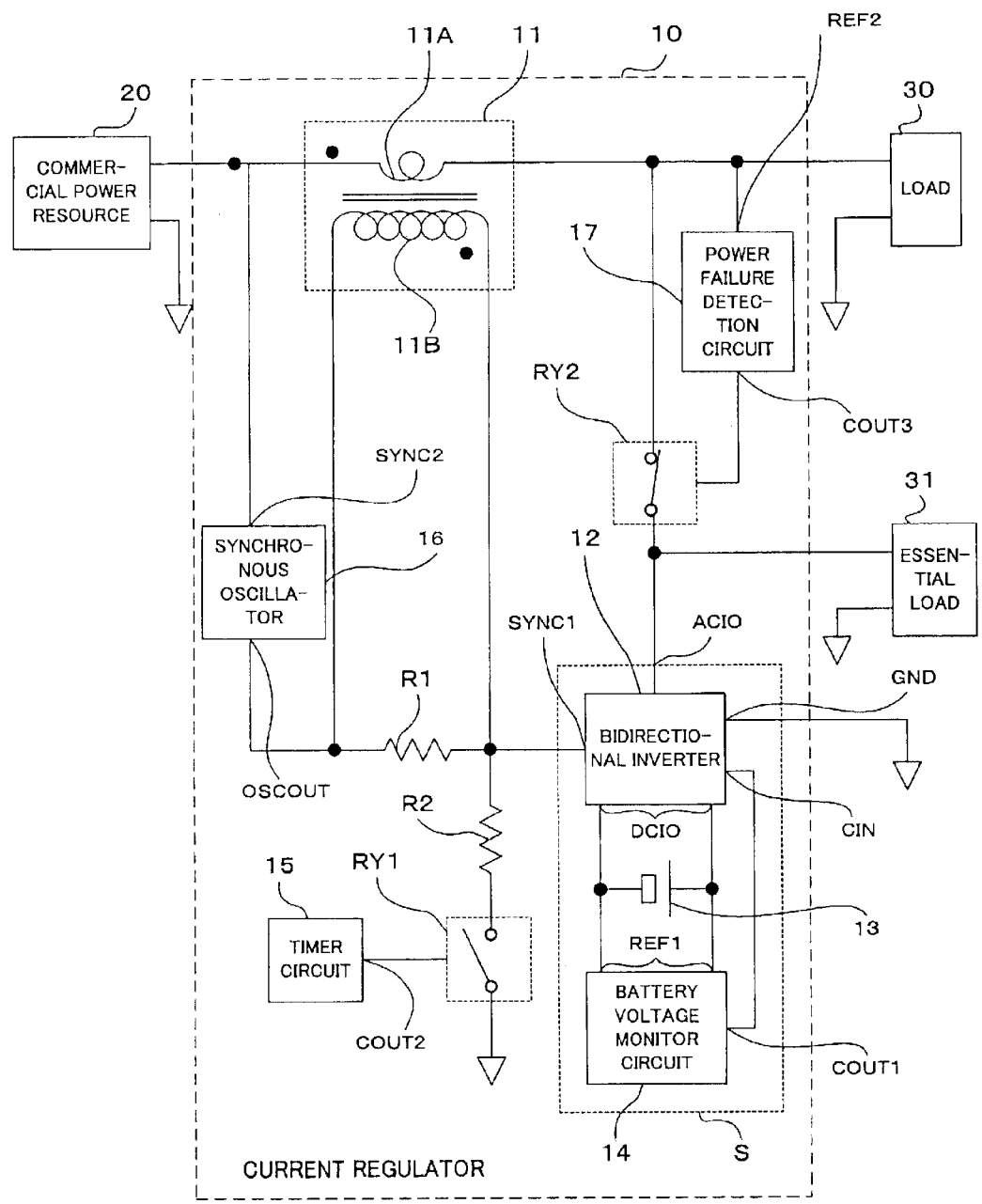
FIG. 3 is a block diagram showing a structure of an example of modification of the current regulator shown in FIG. 2.

Further, the current regulator 10 may have a structure shown in FIG. 3. That is, in addition to the structure shown in FIG. 2, the current regulator 10 may further comprise a synchronous oscillator 16, a power failure detection circuit 17, and a relay RY2. And as shown in FIG. 3, the current regulator 10 may be connected to an essential load 31 that needs to be driven even in a case where a power failure occurs in the commercial power source 20.

The synchronous oscillator 16 comprises a synchronous input terminal SYNC2 and an output terminal OSCOUT. The synchronous input terminal SYNC2 of the synchronous oscillator 16 is connected to the connection point of the commercial power source 20 and the current transformer 11. The terminal out of the both terminals of the secondary winding 11B that was, in FIG. 2, connected to the connection point of the commercial power source 20 and the primary winding 11A, is, instead of this connection point, connected to the output terminal OSCOUT of the synchronous oscillator 16.

The synchronous oscillator 16 outputs from the output terminal OSCOUT, an AC voltage having a fixed amplitude (hereinafter, this amplitude is referred to as a reference amplitude) and also having substantially the same phase as that of an AC voltage which is applied to the synchronous input terminal SYNC2. It should be noted that the synchronous oscillator 16 does not substantially consume electricity supplied to the synchronous input terminal SYNC2. The value of the reference amplitude is within a range of possible values that the amplitude of an AC voltage generated by the commercial power source 20 under normal operation can take.

Once the synchronous oscillator 16 starts outputting an AC voltage from the output terminal OSCOUT, it continues outputting an AC voltage having the reference amplitude with keeping the same phase from the output terminal OSCOUT, even if application of an AC voltage to the synchronous input terminal SYNC2 is stopped after the start of outputting.

The relay RY2 comprises a current path and a control input terminal. The AC input/output terminal ACIO of the synchronous power source S is connected to one terminal of the current path of the relay RY2, instead of being connected to the connection point of the current transformer 11 and the load 30. The other terminal of the current path of the relay RY2 is connected to this connection point. The control input terminal of the relay RY2 is connected to a later-described control output terminal COUT3 of the power failure detection circuit 17.

The relay RY2 substantially cuts off the current path thereof when a control signal is supplied to the control input terminal thereof. On the other hand, when the supply of the control signal is stopped, the relay RY2 turns on the current path thereof.

The power failure detection circuit 17 comprises a reference terminal REF2 and a control output terminal COUT3. The reference terminal REF2 is connected to the connection point of the current transformer 11 and the load 30. The control output terminal COUT3 is connected to the control input terminal of the relay RY2, as described above.

The power failure detection circuit 17 determines whether or not a power failure occurs in the commercial power source 20 based on a voltage applied to the reference terminal REF2. When determining that a power failure occurs, the power failure detection circuit 17 supplies a control signal to the control input terminal of the relay RY2 from the control output terminal COUT3, so that the current path of the relay RY2 is cut off. On the other hand, when determining that no power failure occurs, the power failure detection circuit 17 stops supply of the control signal, so that the current path of the relay RY2 is turned on.

One of both terminals of the essential load 31 is connected to the AC input/output terminal ACIO of the synchronous power source S, and the other terminal is grounded.

In the structure shown in FIG. 3, when a power failure occurs in the commercial power source 20, the AC input/output terminal ACIO of the synchronous power source S is electrically disconnected from both of the commercial power source 20 and the load 30. On the other hand, even after the power failure occurs in the commercial power source 20, an AC voltage having the reference voltage and substantially the same phase as that of the AC voltage which has been generated by the commercial power source 20 by the time the power failure occurs, is applied to the synchronous input terminal SYNC1 of the synchronous power source S. Because of this, an AC voltage having the reference voltage and substantially the same phase as that of the AC voltage generated by the commercial power source 20 is generated to the AC input/output terminal ACIO.

Thus, the structure shown in FIG. 3 functions as an uninterruptible power supply that keeps supply of electricity to the essential load 31 from the synchronous power source S, in spite of the power failure occurring in the commercial power source 20.

Figure 4:
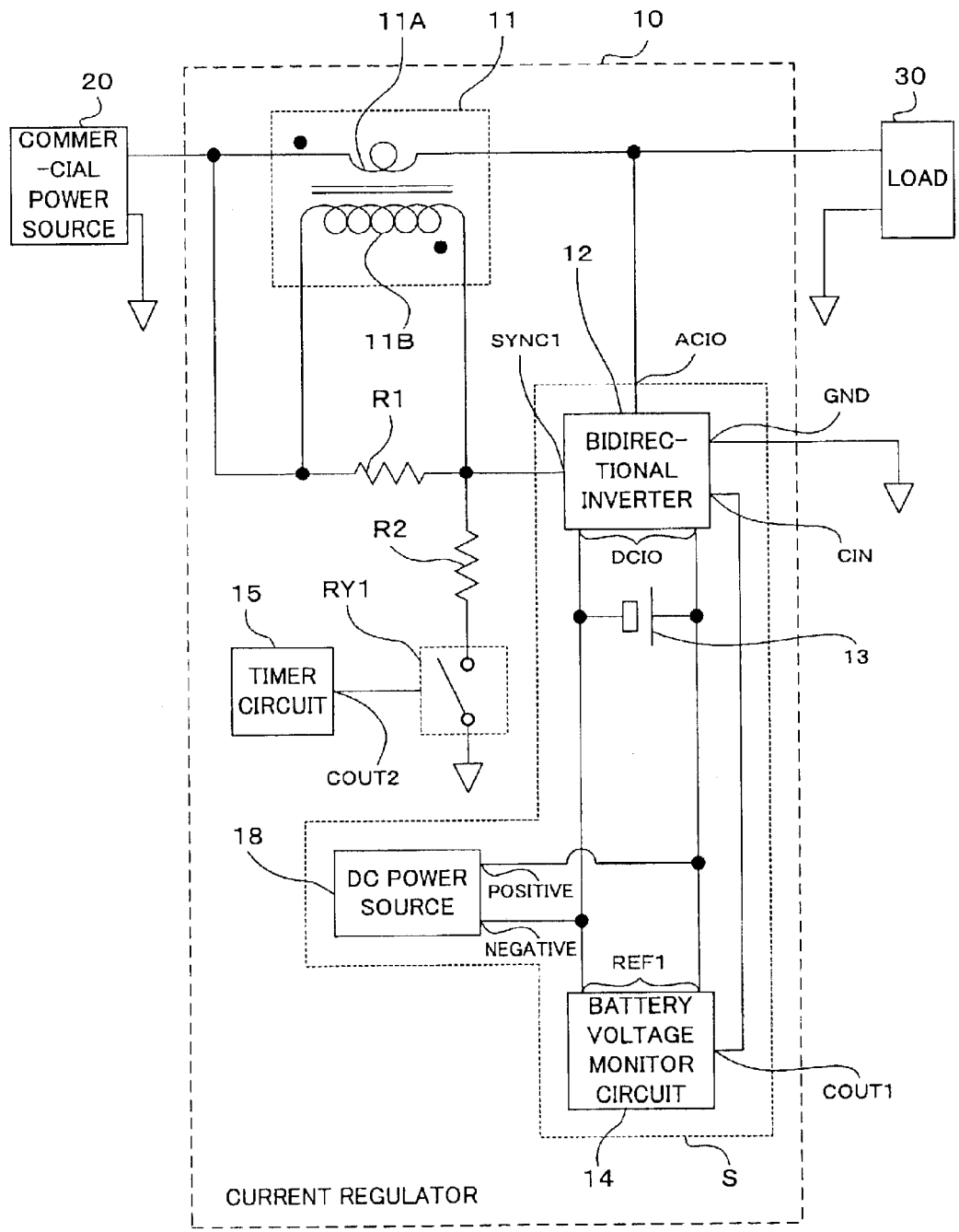
FIG. 4 is a block diagram showing a structure of an example of modification of the current regulator shown in FIG. 2.

Further, the current regulator 10 may have a structure shown in FIG. 4. That is, the synchronous power source S may comprise a DC power source 18 which generates a DC voltage, in addition to the structure shown in FIG. 2 (or in FIG. 3).

The DC power source 18 comprises, for example, a solar battery, a wind power generator and a rectifier, etc. and comprises an anode and a cathode. The anode of the DC power source 18 is connected to the anode of the secondary battery 13, while the cathode of the DC power source 18 is connected to the cathode of the secondary battery 13.

In the structure shown in FIG. 4, the secondary battery 13 is charged with DC electricity generated by the DC power source 18.

The present invention is not limited to the above-described embodiments, but can be modified and applied in various ways.

As described above, according to the present invention, a current regulator and a current regulation method capable of preventing occurrence of a reverse power flow with a simple structure can be realized.

Further, according to the present invention, a current regulator and a current regulation method for efficiently supplying electricity to a load can be realized.

The patent application claims the Paris Convention Priority based on Japanese Patent Application No. 2000-295784 filed with the Japan Patent Office on Sep. 28, 2000, the complete disclosure of which is hereby incorporated by reference.

What is claimed is:

1. A current regulator comprising:
   a current detection unit which is connected between a commercial power source and an external load to which aternating current power is supplied from the commercial power source for detecting a current flowing therethrough, and for generating a voltage corresponding to a direction and a magnitude of the current; and a correction current supplying unit which generates a correction current and controls flowing in or flowing out of the correction current through a connection line connected to the commercial power source and the external load, the correction current based on a superimposed voltage generated by adding the voltage generated at the current direction unit to a voltage of the commercial power source.

2. The current regulator according to claim 1, wherein said current detection circuit comprises a transformer which includes a primary winding which is connected between said commercial power source and said load and a secondary winding which is inductively coupled to said primary winding.

3. A current regulation method comprising:

detecting current flowing between a commercial power source and an external load;

generating a voltage corresponding to a direction and a magnitude of the detected current;

generating a correction current; and controlling flowing in or flowing out of the correction current through a connection line connected to the commercial power source and the external load, the correction current based on a superimposed voltage generated by adding the voltage generated at the step of generating the voltage to a voltage of the commercial power source.

4. The current regulation method according to claim 3, wherein said detecting a direction and a magnitude of a current flowing between said commercial power source and said load is performed based on a signal which is generated by a secondary winding included in a transformer which comprises a primary winding which is connected between said commercial power source and said load, and said secondary winding which is inductively coupled to said primary winding.

5. The current regulator according to claim 1, wherein the correction current supplying unit is configured such that the correction current flows out to the connection line when the current detected has a direction flowing from the commercial power source to the external load, and the correction current flows in from the connection line when the current detected has a direction flowing from the external load to the commercial power source.

6. The current regulator according to claim 1, further comprising:

a timer that determines whether a present time is included in a predetermined time slot; and a first switching unit that controls making and breaking of a current path based on a first control signal outputted from the timer, wherein the correction current supplying unit further comprises:

a correction current generating unit that generates a correction current determined based on the superimposed voltage, and a current-correcting power source that holds a direct current power, wherein the current-correcting power source is a rechargeable battery, and within the predetermined time slot, a part of current from the commercial power source flows into the correction current supplying unit by making the current path, and a part of the current flowing into the correction current supplying unit is charged in the rechargeable battery through the correction current generating unit.

7. The current regulator according to claim 6, wherein the correction current supplying unit further comprises a charging unit that rectifies an electric current, derived from a power flow flowing into the correction current supplying unit through the connection line, to generate a direct current for charging the rechargeable battery.

8. The current regulator according to claim 1, further comprising:

a power failure detecting circuit that detects a power failure of the commercial power source; and a second switching unit that controls making and breaking of the connection line based on a second control signal output from the power failure detecting circuit, wherein the second switching unit makes the connection line when the power failure is not detected, and breaks the connection line when the power failure is detected.

9. The current regulator according to claim 8, further comprising an oscillator that generates a synchronized alternating current voltage having a synchronized phase with a phase of the commercial power source voltage, wherein the oscillator generates the synchronized alternating current voltage and supplies the synchronized alternating current voltage to the correction current supplying unit at the time of power failure of the commercial power source.

10. The current regulator according to claim 6, wherein the correction current supplying unit further comprises a direct current power source for charging the rechargeable battery.

11. The current regulator according to claim 10, further comprising an oscillator that generates a synchronized alternating current voltage having a synchronized phase with a phase of the commercial power source voltage, wherein the oscillator generates the synchronized alternating current voltage and supplies the synchronized alternating current voltage to the correction current supplying unit at the time of power failure of the commercial power source.

12. The current regulation method according to claim 3, wherein the controlling includes flowing out of the correction current to the connection line when the current detected has a direction flowing from the commercial power source to the external load, and flowing in of the correction current from the connection line when the current detected has a direction flowing from the external load to the commercial power source.

13. The current regulation method according to claim 3, further comprising:

determining whether a present time is included in a predetermined time slot; and controlling making and breaking of a current path based on a first control signal output from the determining, wherein the generating the correction current further includes:

generating a correction current based on the superimposed voltage, and holding a direct current power in a rechargeable battery, wherein, within the predetermined time slot, a part of the current from the commercial power source flows into a correction current supplying unit by making the current path, and a part of the current flowing into the correction current supplying unit flows to the rechargeable battery.

14. The current regulation method according to claim 13, further comprising:

rectifying an electric current derived from a power flow flowing into the correction current supplying unit through a connection line to generate a direct current; and charging the rechargeable battery with the direct current.

15. The current regulation method according to claim 3, further comprising:

detecting a power failure of the commercial power source; and controlling making and breaking of a connection line based on a control signal output by the detecting of the power failure, wherein the controlling includes making the connection line when the power failure is not detected and breaking the connection line when the power failure is detected.

16. The current regulation method according to claim 15, further comprising oscillating a synchronized alternating current voltage having a synchronized phase with a phase of the commercial power source voltage, wherein the oscillating includes generating the synchronized alternating current voltage and supplying the synchronized alternating current voltage to a correction current supplying unit at the time of power failure of the commercial power source.

17. The current regulation method according to claim 13, further comprising charging the rechargeable battery by a direct current power source.

18. The current regulation method according to claim 17, further comprising oscillating a synchronized alternating current voltage having a synchronized phase with a phase of the commercial power source voltage, wherein the oscillating includes generating the synchronized alternating current voltage and supplying the synchronized alternating current voltage to a correction current supplying unit at the time of power failure of the commercial power source.

* * * * *

UNITED STATES PATENT AND TRADEMARK OFFICE
CERTIFICATE OF CORRECTION

PATENT NO. : 6,879,061 B2  Page 1 of 1
APPLICATION NO. : 10/148723
DATED : April 12, 2005
INVENTOR(S) : Haneda et al.

It is certified that error appears in the above-identified patent and that said Letters Patent is hereby corrected as shown below:

Assignee: NTT Data Ex Techno (JP), Sinano Electric Co., Ltd. (JP)

Signed and Sealed this

Eighth Day of August, 2006

JON W. DUDAS
*Director of the United States Patent and Trademark Office*